Dec. 29, 1925.

E. VONNEZ ET AL 1,567,478

LOADING DEVICE FOR VEHICLES

Filed March 11, 1921  3 Sheets-Sheet 1

Inventors:
Eugène Vonnez
and Charles Jacquemot
By Lawrence Langner
Attorney

Dec. 29, 1925.  1,567,478
E. VONNEZ ET AL
LOADING DEVICE FOR VEHICLES
Filed March 11, 1921  3 Sheets-Sheet 2
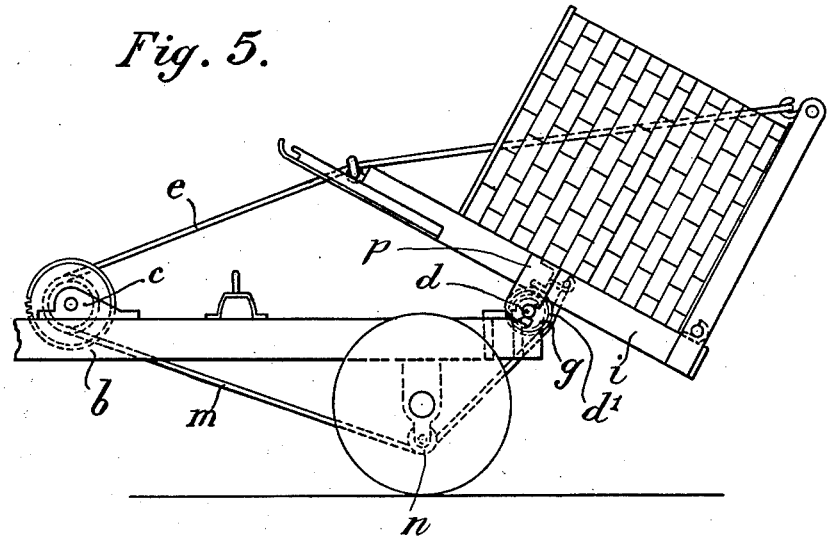
Fig. 5.
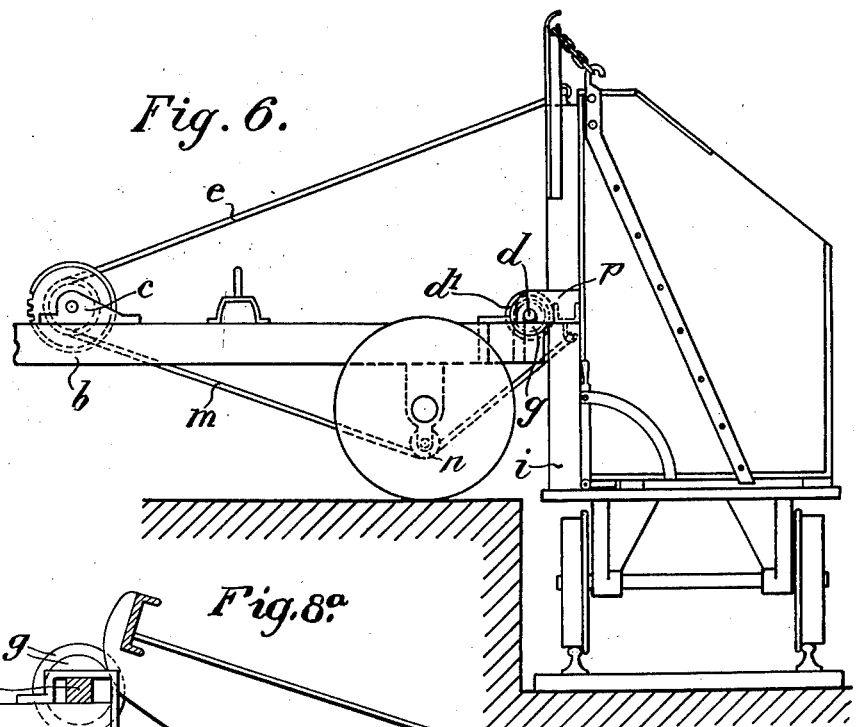
Fig. 6.
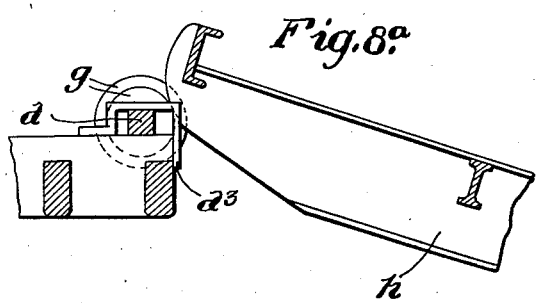
Fig. 8ª.
Inventors:
Eugène Vonnez
and Charles Jacquemot
By Lawrence Langner
Attorney.

Dec. 29, 1925.
E. VONNEZ ET AL
1,567,478
LOADING DEVICE FOR VEHICLES
Filed March 11, 1921   3 Sheets-Sheet 3
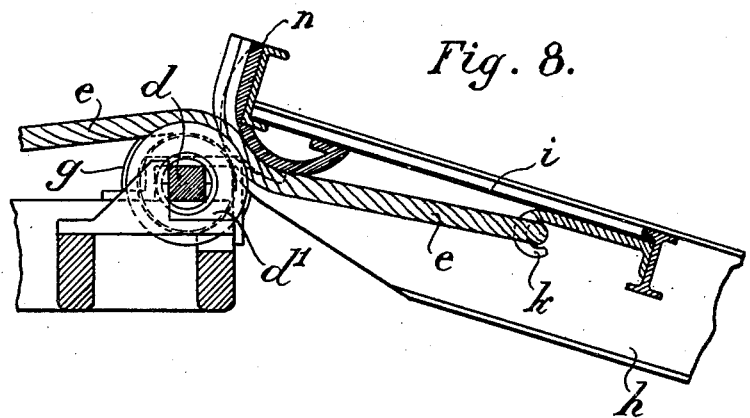
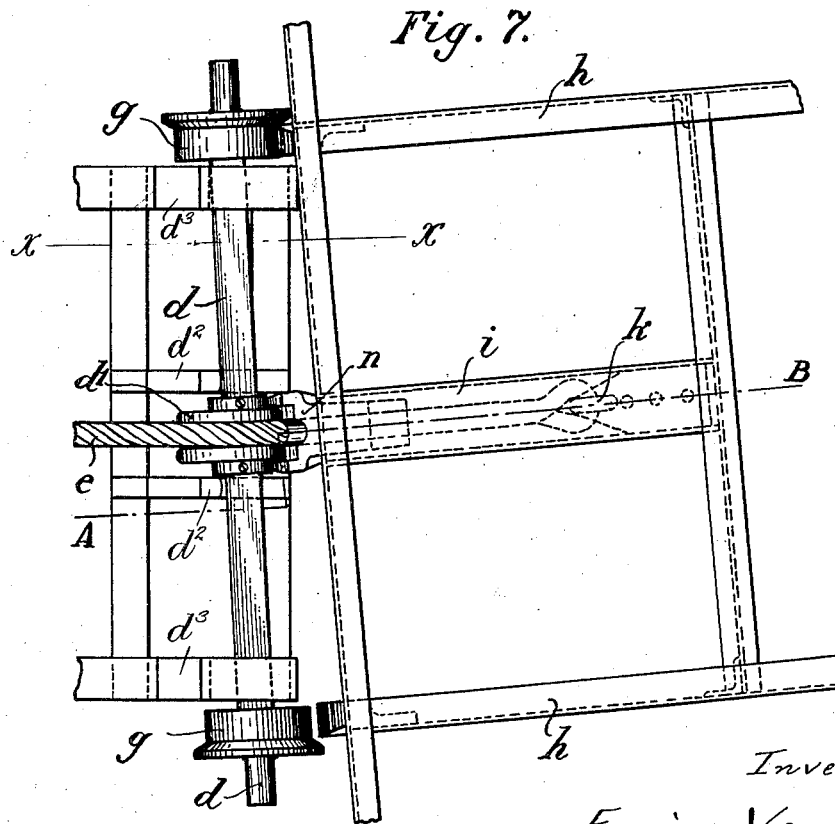
Inventor.
Eugène Vonnez
and Charles Jacquemot
By Lawrence Langner
Attorney Patented Dec. 29, 1925.

1,567,478

UNITED STATES PATENT OFFICE.

EUGÈNE VONNEZ AND CHARLES JAQUEMOT, OF GENEVA, SWITZERLAND.

LOADING DEVICE FOR VEHICLES.

Application filed March 11, 1921. Serial No. 451,430.

*To all whom it may concern:*

Be it known that we, EUGÈNE VONNEZ and CHARLES JAQUEMOT, citizens of Switzerland, and residents of Route de St. Julien, Geneva, Switzerland, have invented Improvements in or Relating to a Loading Device for Vehicles, and do hereby declare the nature of this invention and in what manner the same is to be performed, to be particularly described and ascertained in and by the following statement.

The object of this invention is to provide a device for loading vehicles of known design and allowing a given automobile vehicle to receive a plurality of interchangeable bridges, allowing at one place a bridge independent of the vehicle to be loaded, while the vehicle is conveying goods previously loaded upon another bridge to another place.

The accompanying drawings show diagrammatically and by way of example, embodiments of the invention.

Fig. 4 shows the device when the independent bridge is being unloaded and is forced by the winch of the vehicle into a more or less vertical position for unloading the goods or dumping the load, as for instance, sand or the like.

Fig. 5 represents another embodiment of the invention, the bridge shown being particularly adapted for loading brick and similar material.

Fig. 6 shows a modified form of bridge particularly adapted for loading and unloading sand and the like.

Fig. 7 is a plan view, on an enlarged scale, of the front part of an interchangeable bridge, adapted to facilitate the loading of the latter.

Fig. 8 is a vertical section on the line A—B of Fig. 7, and

Fig. 8ª is a section on line X—X of Fig. 7.

In Figs. 1 to 4, $a$ is an automobile vehicle, of which the frame $b$ carries a winch $c$ and bearings for a shaft $d$. This shaft is partly of rectangular cross-section (Fig. 7) and is provided at its middle with a pulley $d^1$ having a groove for receiving a rope or chain $e$. The edges of this groove serve at the same time as a support for the middle part of a removable bridge $i$. The shaft $d$ carries on each of its ends, guide rollers $g$ upon which can engage the longitudinal side beams $h$ of the independent bridge $i$. The removable bridge $i$ is provided at its front end with a hook $k$ (Fig. 2) onto which the free extremity of rope $e$ can be fixed. On the rear end of the bridge $i$ another hook $k^1$ (Fig. 2) is provided, onto which the extremity of a rope $m$, attached to the winch $c$, can be attached for a purpose to be later explained.

Figure 1:
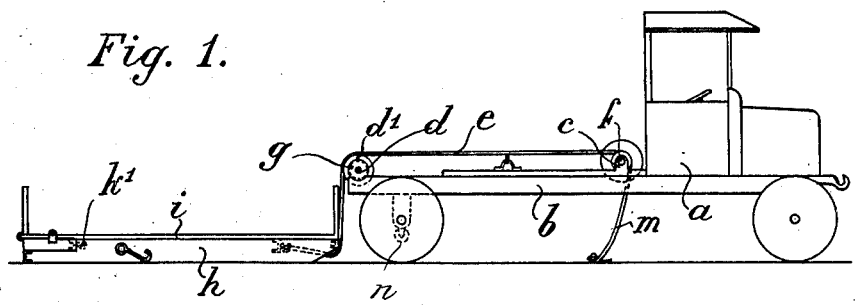
Fig. 1 shows a vehicle at the rear of which, and independently from the vehicle, a bridge is placed on the ground, ready to be raised onto the vehicle.
Figure 2:
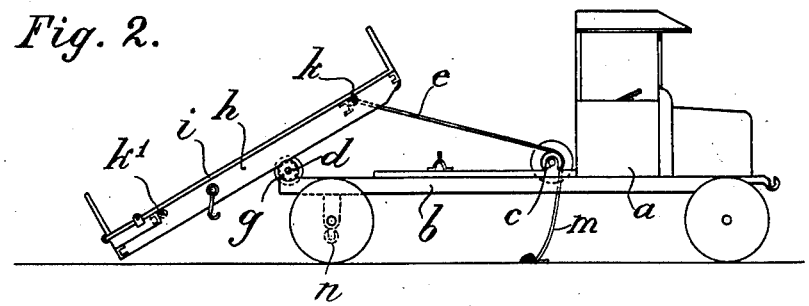
Fig. 2 illustrates how the bridge at the beginning of its tilting motion, is brought upon the vehicle.
Figure 3:
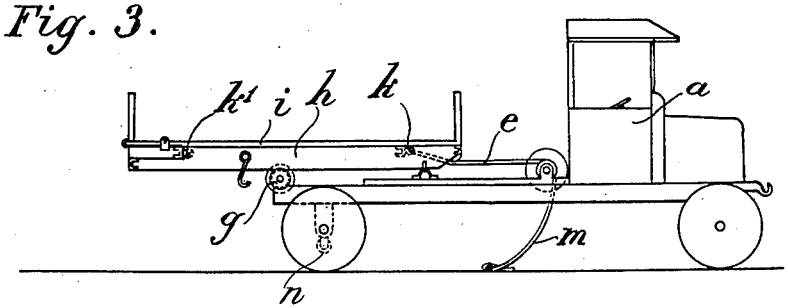
Fig. 3 represents the same device after the bridge has completed its tilting motion and is brought into its final position on the vehicle.

When the different members of the loading device are in the position of Fig. 1, if the motor of the vehicle, which is adapted for driving the winch $c$, is started, the rope $e$ passing over the pulley $d^1$ begins to raise the front end of the bridge $i$ until its middle portion, which is properly designed therefor, comes to rest upon the edges of the grooved pulley $d^1$ while subsequently the longitudinal beams $h$ come to rest upon the rollers $g$. If now the pull of the winch $c$ on the rope $e$ continues, the bridge $i$ will successively take the positions according to Figs. 2 and 3, and finally reach the end of its course.

In the figures of drawing the bridge $i$ is represented as empty, for the purpose of rendering the drawings more clear. When the bridge is loaded the functions of the device are unchanged. During the manipulations above described, the rope $m$ remains out of action.

In order to unload a load carried by the bridge $i$ the free end of the rope $m$ attached to winch $c$ is passed over a pulley $n$ suitably fixed below the rear truck and is brought around the back end of the vehicle proper and finally attached to front hook $k$. The winch $d$ is then rotated in a direction opposite to that in which it rotated for loading, so that the rope $e$ is uncoiled while a tractive force is exercised on the rope $m$ and thereby the bridge $i$ is caused to slowly slide backwards on the rollers $g$ until the weight of the load makes it tilt over the rear end. Up to the moment at which the rear end of the bridge $i$ touches the ground, the ropes $e$ and $m$ are both stretched taut (see Fig.

5), but at that moment the rope m is released from the hook k either by hand or in any other suitable manner. While the rope e continues to unwind the longer lever arm of the bridge i is exercising a pressure upon the vehicle and slowly pushes it forward if the weight of the bridge is sufficiently great. If this is not the case, the driver will operate the vehicle in accordance with the uncoiling of the rope e, to slowly advance, so that the front part of the bridge i is finally completely free from the rollers g and pulley $d^1$ and gradually according as the speed of the unwinding of rope e allows it, the bridge will be lowered flat onto the ground (Fig. 1).

Figure 4:
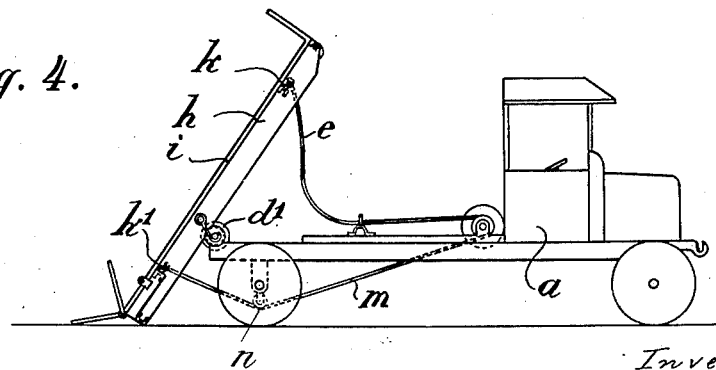

If the bridge i is not to be laid flat on the ground, but brought into a more or less vertical position, say as shown in Fig. 4, the rope m may at the very moment of the tilting of the bridge i, be released from the hook k by hand or in any known suitable manner and thereupon be attached to another hook at the rear of the bridge such for instance as the hook $k^1$. It is evident that as the winch c continues to rotate in the same direction, the rope e finally becomes loose as per Fig. 4.

When the bridge i is caused to again take its horizontal position on the vehicle (Fig. 2) no blow is to be feared since the center of gravity of the bridge i is transferred only when in front of the pivot $d^1$, and after the bridge has nearly reached its horizontal position on the frame b, and further, owing to the suitable choice of the height of the winch onto which the rope e is wound, the bridge i is slowly brought from its slanting, into a horizontal, position.

Any sudden change of the position of the bridge i, causing a shock or a blow is thus avoided.

Fig. 5 shows another design for the bridge i which is particularly adapted for loading and unloading building materials, as bricks for instance, which bridge otherwise is manipulated in exactly the same manner as described with reference to the one illustrated in Figs. 1 to 4.

The box like bridge shown in Fig. 6 is adapted for loading and unloading sand and similar material. As shown, the bridge i, loaded on a truck o, can be brought close to the rear of the vehicle a. The bridge i, as represented in Figs. 5 and 6, of suitably reduced length, is provided with lateral abutments p which are adapted to engage, after the bridge has completed part of its backward motion, with the rounded extremities of the roller shaft d (Fig. 7), whereby the bridge i is caused to tilt on the rollers g and pulley $d^1$, and to take a vertical position either for unloading or for loading bricks and sand. It is evident that it is essential that that part of the bridge i which is situated rearward of the shaft d be in any case not longer than the distance of said shaft d from the ground or from the plane onto which the rear wall of the bridge is to come to rest, in order to allow at least an approximately vertical position of the bridge floor (Fig. 6).

In order to facilitate the raising of the bridge i such as described, its front part is preferably designed as shown on an enlarged scale, in the Figs. 7 and 8.

A cast guiding member n of bow shape, is fixed to the front central part of the bridge i and will, at the moment when the bridge reaches the height of the guiding pulley $d^1$ come to bear on the edges of the pulley before the side beams h of the bridge i contact with the lateral rollers g (Fig. 7). Such an arrangement allows the load to be taken directly from the ground without it being necessary to bring the vehicle exactly into line with the bridge to be moved since the roller shaft d is allowed to swivel in its bearings $d^2$ (Fig. 7). To hold the shaft d on the vehicle, while allowing it to swivel, the ends of the shaft, inside the rollers g are received in enclosing brackets $d^3$. Shaft d, as pointed out above, is of square cross section throughout most of its length, as indicated by the crossed lines on the same, in Fig. 7.

Instead of providing for fixed hooks k, $k^1$, the position of the points at which the ropes m and e are attached for moving the bridge i can be variable and even movable, for instance, in such a way that in a given position of the bridge i one rope, by means of a suitable arrangement can, in any known manner, either in unwinding or in winding up, move along the rope and release the same at the moment at which the bridge has reached a predetermined position.

Having now described the invention and a manner in which it can be carried out, we declare that what we claim is:

1. A loading device for vehicles, comprising a vehicle frame, a winch mounted on the frame, a guide roller mounted on the rear of the frame, an interchangeable loading bridge wholly independent of the vehicle, two cables cooperating with the bridge and actuated by the winch, one cable being operable to move the bridge from the ground to a position on the frame, and the other cable being operable to move the bridge from the frame to the ground, a guide pulley on the rear end of the frame, a single contact member on the center front of the bridge, the single contact member and guide pulley contacting before any other portion of the bridge touches the vehicle frame, upon the bridge being brought onto the frame.

2. A device according to claim 1, a guide pulley on the rear end of the frame, a single contact member on the center front end of the bridge and projecting beyond the bridge end, the single contact member and guide pulley contacting before any other portion of the bridge touches the vehicle frame, upon the bridge being brought onto the frame, said contact member being a curved member positioned in the longitudinal central plane of the bridge, the bridge having side, longitudinal guide girders.

3. A device according to claim 1, a guide pulley at the center of the rear end of said frame, guide rollers at the sides of the rear end of the frame, a central contact member on the front end of said bridge, and longitudinal side rails on the bridge, the pulley and rollers and the contact member and side rails being positioned to respectively contact upon the bridge being brought onto the frame.

4. A device according to claim 1, a guide pulley at the center of the rear end of said frame, guide rollers at the sides of the rear end of the frame, a central contact member on the front end of said bridge, and longitudinal side rails on the bridge, the pulley and rollers and the contact member and side rails being positioned to respectively contact upon the bridge being brought onto the frame, said contact member projecting beyond the front end of the bridge, and the lower front ends of the side rails being undercut.

5. A device as described, comprising, in combination, a vehicle frame, a winch on the frame, two cables connected to the winch, and a plurality of interchangeable loading bridges for receiving goods, said bridges each having a plurality of members for receiving the free ends of the two cables controlled by the winch, one of said cables causing backward movement of a bridge when the bridge is mounted on the vehicle frame, and being arranged below the vehicle frame, the other cable being arranged above the vehicle frame to raise a bridge from the ground and onto the vehicle frame and to steady the bridge while it is being manipulated, abutments on said bridges at their middle portions, members fixed to the vehicle frame, the abutments engaging the members fixed on the vehicle frame, to thereby cause the bridge to rock so as to bring its floor into a vertical position.

6. A device according to claim 1, the distance from said abutments to the rear end of the bridge not exceeding the distance from the ground to said members fixed to the vehicle frame.

7. A device according to claim 1, a guide pulley on the rear end of the frame, a single contact member on the center front end of the bridge and projecting beyond the bridge end, the single contact member and guide pulley contacting before any other portion of the bridge touches the vehicle frame, upon the bridge being brought onto the frame, and a shaft pivoted to the vehicle frame and carrying said guide pulley.

8. A device according to claim 1, a guide pulley on the rear end of the frame, a single contact member on the center front end of the bridge and projecting beyond the bridge end, the single contact member and guide pulley contacting before any other portion of the bridge touches the vehicle frame, upon the bridge being brought onto the frame, said contact member being a curved member positioned in the longitudinal central plane of the bridge, the bridge having side, longitudinal guide girders, and a shaft pivoted to the vehicle frame and carrying said guide pulley.

9. A device according to claim 1, a guide pulley at the center of the rear end of said frame, guide rollers at the sides of the rear end of the frame, a central contact member on the front end of said bridge, and longitudinal side rails on the bridge, the pulley and rollers and the contact member and side rails being positioned to respectively contact upon the bridge being brought onto the frame, and a shaft pivoted to the vehicle frame and carrying said guide pulley and guide rollers.

In testimony whereof we affix our signatures.

EUGÈNE VONNEZ.
CHARLES JAQUEMOT.